March 7, 1944. W. H. BARTOLETT 2,343,492
REDUCTION GEAR LUBRICATION APPARATUS
Filed Aug. 4, 1942 2 Sheets-Sheet 1

INVENTOR
WILLIAM H. BARTOLETT.
BY
ATTORNEY

March 7, 1944. W. H. BARTOLETT 2,343,492
REDUCTION GEAR LUBRICATION APPARATUS
Filed Aug. 4, 1942 2 Sheets-Sheet 2
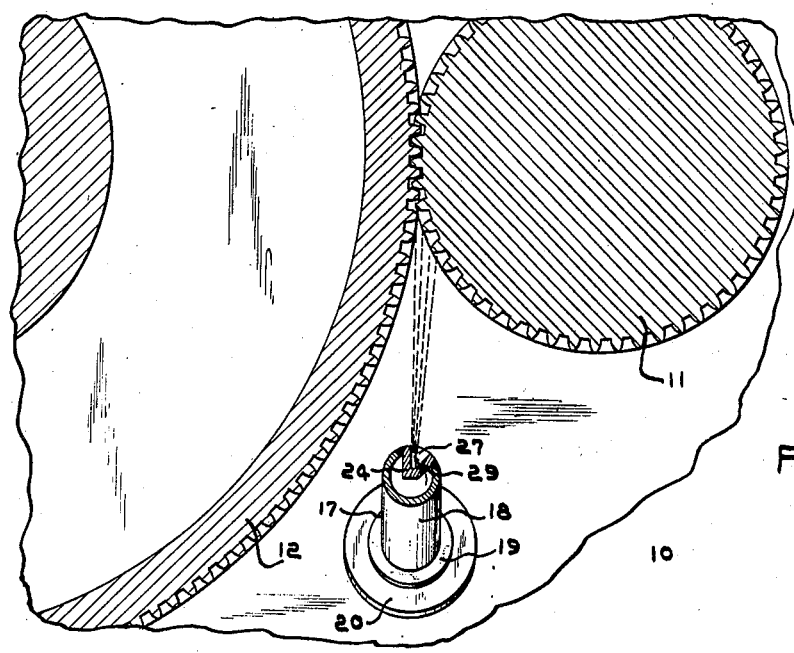
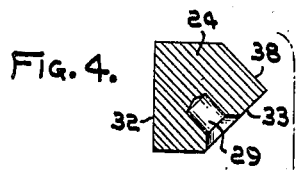
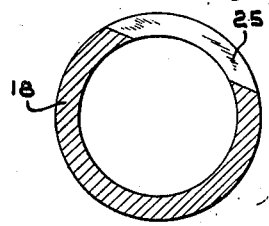
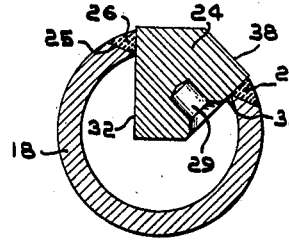
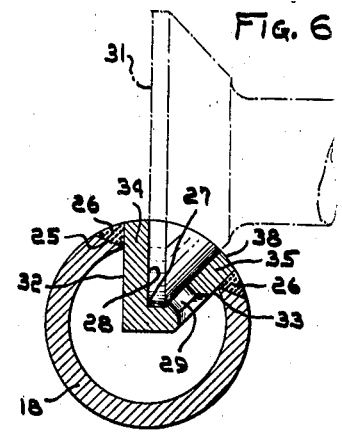
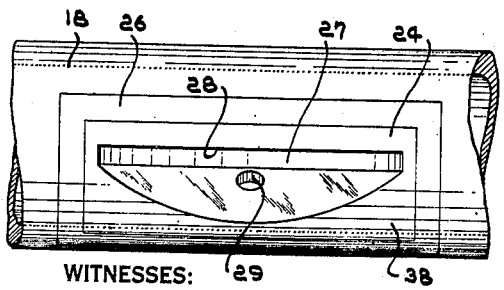
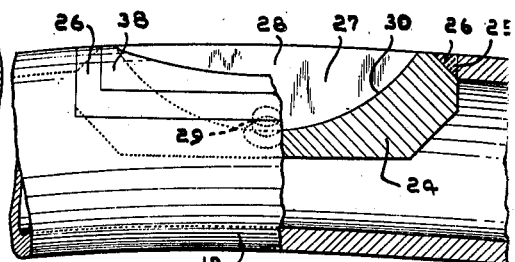
WITNESSES:
INVENTOR
WILLIAM H. BARTOLETT
BY
ATTORNEY

UNITED STATES PATENT OFFICE 2,343,492

REDUCTION GEAR LUBRICATION APPARATUS

William H. Bartolett, Haddon Heights, N. J., assignor to Westinghouse Electric & Manufacturing Company, East Pittsburgh, Pa., a corporation of Pennsylvania Application August 4, 1942, Serial No. 453,497

3 Claims. (Cl. 299—121)

The invention relates to the lubrication of reduction gearing and it has for an object to provide an improved spray device serving this purpose.

A more particular object of the invention is to provide a spray device for reduction gearing and which is comprised by a pipe with inwardly-extending lugs whose outer surfaces are disposed substantially flush with or conforming to the cylindrical outer surface of the pipe and wherein each plug is formed with a cavity and an opening for supplying oil from the interior of the pipe to the cavity, the opening being so positioned that oil is discharged therethrough from the pipe and against the opposed cavity surface with an outward component of motion therealong to provide a fan-like sheet or spray for lubricating meshing gears.

These and other objects are effected by the invention as will be apparent from the following description and claims taken in connection with the accompanying drawings, forming a part of this application, in which:

Fig. 3 is a sectional view taken along the line III—III of Fig. 2;

Figs. 4, 5 and 6 are detail sectional views showing how the plugs are attached to the spray pipe and are machined to provide the necessary spray passage; and Figs. 7 and 8 are views showing in greater detail a plug and its relation to the spray pipe.

Figure 1:
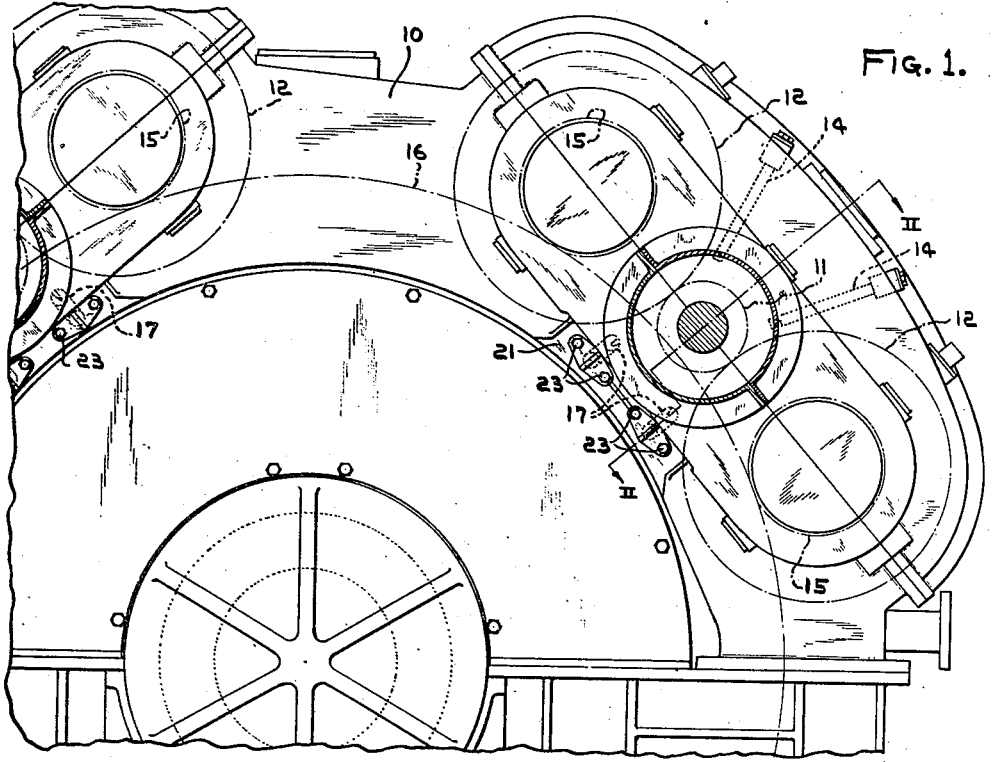
Fig. 1 is a fragmentary end elevational view of a reduction gear showing the gear oil spray applied thereto.
Figure 2:
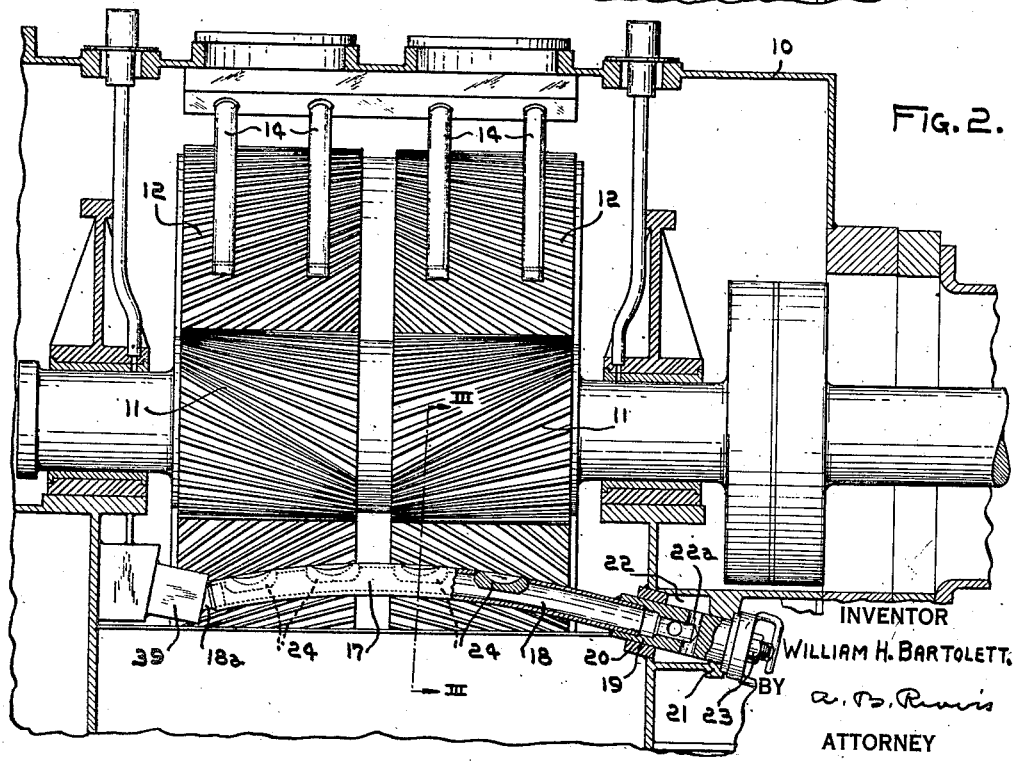
Fig. 2 is a sectional view taken along the line II—II of Fig. 1.

In Figs. 1, 2 and 3, there is shown a gear casing 10 enclosing a pair of meshing gears 11 and 12. It is common practice with gears of this type, to lubricate the meshing region by means of spray devices such as the depending pipes 14 connected to any suitable source of oil under pressure.

As marine propulsion gears turn in opposite directions for forward and astern operation, it is necessary to provide spray devices above and below the meshing region. With certain designs of double reduction gearing, the limited space available makes it difficult to follow standard practice with respect to the lowermost spray devices, or those located inwardly of the high-speed pinion and high-speed gear and toward the low-speed gear. For example, as shown in Fig. 1, the high-speed pinion 11 meshes with high-speed gears 12 connected to low-speed pinions 15 meshing with the low-speed gear 16. Oil is supplied to the outer cusp spaces defined by the pinion 11 and the pair of gears 12 meshing therewith by means of the devices 14, but, because of space limitations imposed by the structure, spray devices, such as the outer spray devices 14, cannot be used for the inner cusp spaces, and it is an object of the present invention to provide a spray device, at 17, suitable for use in this and like situations.

The improved spray device, at 17, comprises a tube 18 connected to a head 19 which fits registering openings formed in the spaced wall portions 20 and 21 of the gear casing 10 and which form an oil supply space 22. The device is held in place by detachable means 23 accessible externally of the gear casing.

The inner end of the tube is closed, for example, by a plug 18a, and oil is supplied to the interior of the tube from the head, the latter having passages 22a formed therein and serving to place the space 22 in communication with the interior of the tube.

With oil supplied to the space 22 under suitable pressure, it is sprayed therefrom by the spray device, at 17, the sprays being directed toward the meshing regions of the gears.

Referring now to the spray features more in detail, these are provided by plugs 24 fitting openings 25 formed in the wall of the tube 18 and extending lengthwise of the latter, the plugs being joined to the opening boundaries by welds 26. Each plug has an outwardly-opening channel 27 providing a deflector surface 28. An opening 29 formed in the plug provides for discharge of oil from the interior of the tube for impingement against the deflector surface 28 with an outward component of direction, so that oil may issue from the outwardly-diverging channel as a fan-like spray or jet against the meshing region of the gears.

The plug 24 and the pipe 18 are produced separately so that certain operations may be performed on each, after which the plugs are connected to the tube and further operations are performed on each plug so that the latter constitutes a spray element. The tube 18 has suitable openings 25 formed therein and the wedge-shaped plugs 24 are inserted in the openings and welded to the tube. Before a plug is inserted in its opening 25, an opening 29 is drilled in the portion thereof which is to extend within the tube; and, after the plug is welded to the tube, the channel or cavity 27 is formed therein preferably by means of a milling cutter 31, the channel so formed intersecting the opening 29 and having an arcuate bottom 30.

The channel or cavity 27 and the outer side surfaces 32 and 33 of the plug cooperate to provide side walls 34 and 35, the opening 29 extending through the side wall 35 and being positioned so as to discharge oil from the interior of the pipe against the channel deflector surface 28 of the wall 34 with an outward component of motion in order that oil may issue from the spray device in a fan-like jet directed toward the meshing region of the gears. As shown, each channel deflector surface 28 is arranged so that the plane thereof extends through the meshing region so that the sprays may be properly directed.

Preferably, the plugs 24 are wedged-shaped with the thick ends thereof presenting outside surfaces 38 facing toward the associated meshing region, and such surfaces closely conform to the outside cylindrical surface of the tube so as to facilitate assembly and removal of the device.

As shown, the head 19 is of larger diameter than the tube to provide both for a telescoping connection thereof with respect to the tube and for an opening in the gear casing wall which is sufficiently large to facilitate insertion and removal of the device. Furthermore, as shown in Figs. 1, 2 and 3, due to the limitations imposed by the gearing and its casing, the tube 18 is bowed toward the meshing region and the inner end thereof is supported, when assembled, by a socket member 39 connected to the casing. With this arrangement, the spray openings are close enough to the meshing region for effective lubrication of the gears while, at the same time, insertion and removal of the device may be effected in an arcuate path to clear structure which would interfere with the tube 18 if the latter were straight.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a lubricating device, an oil spray pipe, and one or more plugs extending within the pipe and joined thereto; each plug having a cavity opening through the outside face thereof, said cavity cooperating with opposed outer side surfaces of the plug to define a pair of opposed walls extending within the pipe and one of the walls being provided with an opening for discharging oil from the interior of the pipe against the cavity surface of the opposed wall with an outward component of motion, each plug being welded to the pipe and having its outside face substantially flush with the external surface of the latter.

2. In a lubricating device, an oil spray pipe, one or more wedge-shaped plugs extending within the pipe and joined thereto; each plug having its thick end disposed externally of the pipe interior and provided with a cavity opening through said thick end, said cavity cooperating with the outer converging surfaces of the plug to define converging walls extending within the pipe and one of the walls being provided with an opening positioned so as to discharge oil from the interior of the pipe against the cavity surface of the opposed wall with an outward component of motion.

3. The combination as claimed in claim 2 wherein each plug is welded to the pipe and has its thick end surface formed as a cylindrical element substantially conforming to the outer cylindrical surface of the pipe.

WILLIAM H. BARTOLETT.